United States Patent [19]

Brook

[11] 4,096,950

[45] * Jun. 27, 1978

[54] SORTING SYSTEMS AND SENSING DEVICES FOR USE THEREWITH

[75] Inventor: Richard Morley Brook, Huddersfield, England

[73] Assignee: AutoSystems Limited, England

[*] Notice: The portion of the term of this patent subsequent to Dec. 14, 1993, has been disclaimed.

[21] Appl. No.: 736,059

[22] Filed: Oct. 27, 1976

Related U.S. Application Data

[63] Continuation-in-part of Ser. No. 495,016, Aug. 5, 1974, Pat. No. 3,997,013.

[51] Int. Cl.² .............................................. B07C 5/28
[52] U.S. Cl. ................................. 209/121; 209/74 M; 177/50
[58] Field of Search .................... 209/73, 74 M, 74 R, 209/121; 177/50, 52–57, 83, 119

[56] References Cited

U.S. PATENT DOCUMENTS

| 3,259,240 | 7/1966 | Schneider | 209/74 R |
| 3,339,651 | 9/1967 | Garnett | 177/55 |
| 3,574,328 | 4/1971 | Holmes | 209/74 R |
| 3,651,936 | 3/1972 | Powell | 209/121 X |
| 3,997,013 | 12/1976 | Brook | 209/121 X |

*Primary Examiner*—Robert B. Reeves
*Assistant Examiner*—Joseph J. Rolla
*Attorney, Agent, or Firm*—John C. Smith, Jr.

[57] ABSTRACT

The invention discloses a weight sorting system wherein a single weighing station controls a plurality of weight-range article removal stations. These removal stations are disposed downstream of the weighing station and sorting information is synchronously passed with the articles on route to discharge. The rate at which articles are selected for removal at a given station is controlled by varying the weight range for that station. The weighing system is constantly re-calibrated by employing a plurality of test weights, one for each sorting weight range, carried by the conveyor system and an electronic compensating unit.

15 Claims, 6 Drawing Figures

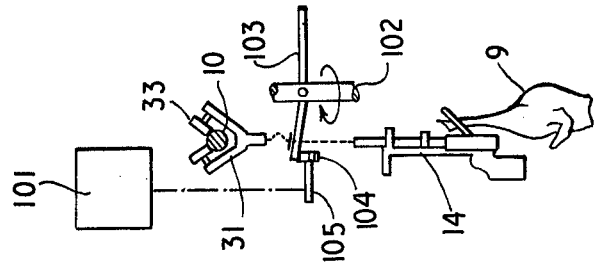
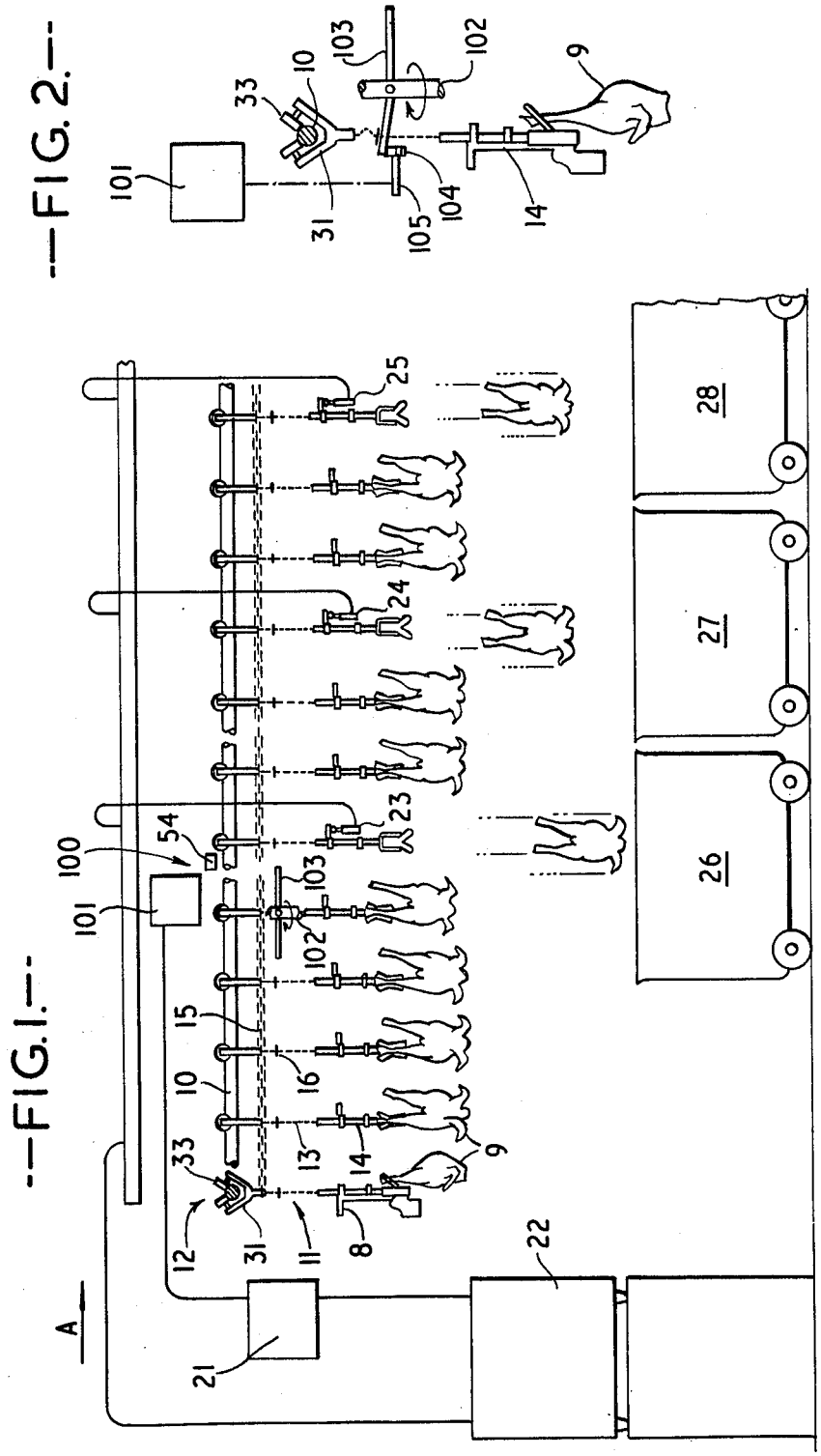

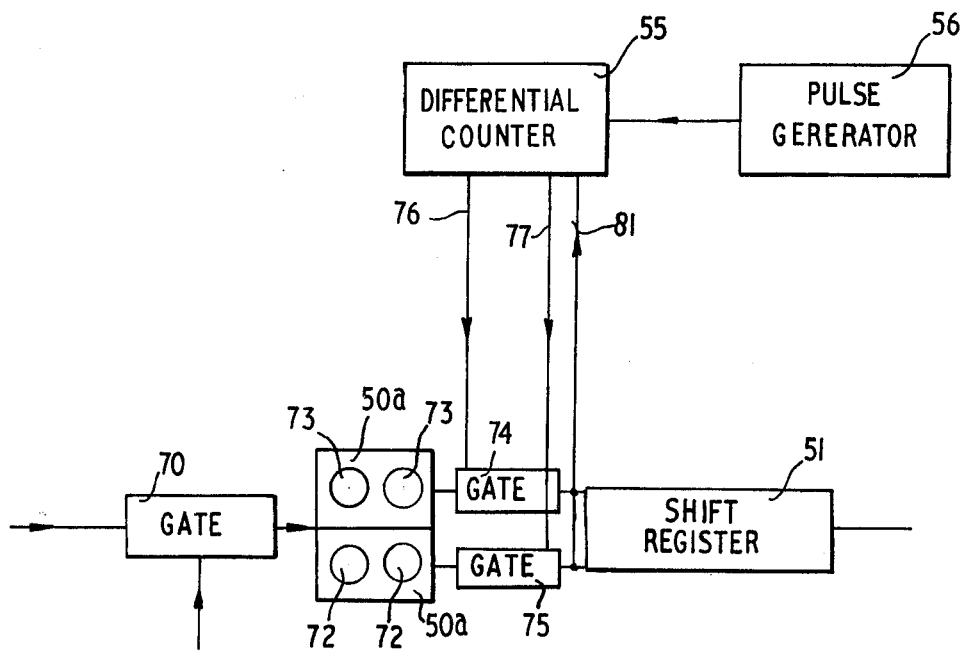
--FIG.4.--
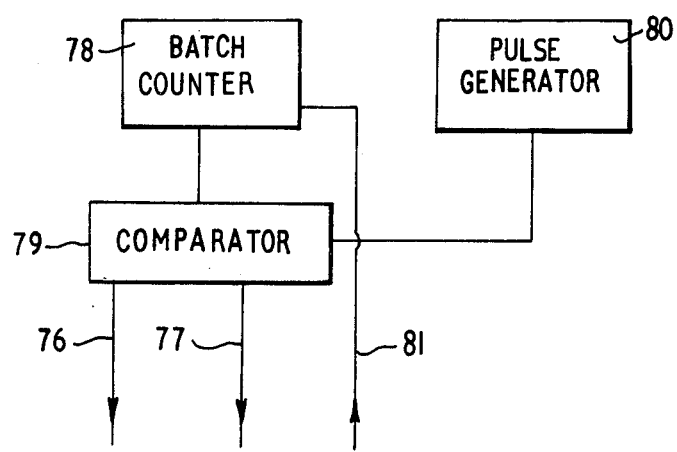
--FIG.4a--

SORTING SYSTEMS AND SENSING DEVICES FOR USE THEREWITH

This application is a continuation-in-part of application Ser. No. 495,016 filed Aug. 5, 1974 now U.S. Pat. No. 3,997,013.

BACKGROUND TO THE INVENTION

The invention relates to sorting and sensing apparatus, and particularly but not exclusively to such apparatus for use in poultry processing.

DESCRIPTION OF THE PRIOR ART

Sorting and sensing apparatus is known for use in the processing of poultry. It is common in poultry processing to convey a succession of carcasses through various processing stations, and frequently it is desired to sort the carcasses by weight after a particular process or set of processes has been carried out. However the known apparatus has not been particularly versatile and has been cumbersome in operation. In general weighing has been carried out using scale beams, for example as disclosed in U.S. Pat. No. 3,642,130, and similar apparatus which is bulky and takes considerable time to set up on a conveyor system. In general when it has been desired to sort carcasses into say, three weight ranges, it has been necessary to provide three or more scale beams, at least one for each weight range. Furthermore it has generally been necessary to provide a section of floating conveyor track associated with each scale beam and this substantially increases the cost of installing the conveyor system and the time taken for installation. Once the known systems have been installed, they do not lend themselves to further adaptation and are relatively inflexible. For instance it is relatively difficult to vary the number of weight ranges catered for, or to adjust the limits of existing ranges.

In the known system, articles are removed from the conveyor at the point at which they are weighed, but this greatly reduces the flexibility of the systems, since the article removal points cannot be positioned at whichever points are most convenient in a given working area. The positioning of the removal apparatus is dictated by the positioning of the weighing apparatus and cannot readily be altered once the weighing apparatus has been installed. Furthermore, a weighing apparatus is required at each point where it is desired to remove articles and if it is desired to remove articles and if it is desired to have a large number of removal points, as may well be the case in a modern poultry processing plant, the amount of weighing apparatus may become inconveniently large, and a substantial amount of space may be taken up. This lack of flexibility is a serious drawback, since in a modern poultry processing plant it may well be desired to alter the number and positioning of the article removal points from time to time, to suit variations in demand for different types of poultry, which require variations in the processing.

SUMMARY OF THE INVENTION

It is an object of the invention to overcome the disadvantages of the prior art apparatus, by providing apparatus which is much more flexible than known systems. Replacing the known weighing apparatus by electrical apparatus may reduce the problem slightly, by reducing the size of the weighing equipment required, but the system would still be relatively inflexible. However, I have appreciated that not only can the weighing be carried out electrically, but control equipment can be utilised to enable a single weighing apparatus to control any desired number of article removal points positioned at any desired location irrespective of where the weighing apparatus is located. The key lies in storing weight information and utilising the information in synchronism with the movement of articles along the conveyor. I have discovered that pulses generated by the moving articles can be used to synchronise the weight information with the movement of the articles and accordingly the invention provides a conveyor system for use in sorting a plurality of articles according to their weight, said system comprising: a conveyor for conveying said articles in succession along a path; a weight sensing device arranged along said path to emit a weight signal related to the weight of each article sensed by said weight sensing device as each article moves along at least a portion of said path; an article sensing device arranged along said path to emit pulses as articles pass said article sensing device; a plurality of removal devices for removing articles from said conveyor, said removal devices being placed apart along said path downstream of said weight sensing device; and control means connected to said weight sensing device, said article sensing device and each of said plurality of article removal devices, said control means being adapted to receive said weight signals and said pulses and to selectively control said article removal devices in dependence upon said weight signals and pulses received to sort said articles by weight.

Where a conveyor system is required to sort articles into plurality weight ranges, the flexibility and usefulness of the system can be increased considerably if the weight ranges into which the articles are to be sorted may be varied automatically if desired, to suit conditions and requirements. Accordingly, the invention also provides a conveyor system for use in sorting a plurality of articles according to their weight, said system comprising: a conveyor for conveying said articles in succession along a path; a weight sensing device arranged along said path to emit a weight signal related to the weight of each article sensed by said weight sensing device as each article moves along at least a portion of said path; a plurality of removal devices for removing articles from said conveyor, said removal devices being spaced-apart along said path downstream of said weight sensing device; control means connected to said weight sensing device and each of said plurality of article removal devices, said control means being adapted to receive said weight signals and to selectively control said article removal devices so that each article removal device removes from the conveyor articles lying within a preselected weight range; means for preselecting a desired rate of article removal by at least one of the article removal devices; and means for increasing the weight range associated with said one article removal device if the rate at which articles are removed differs from said preselected desired rate.

The calibration of conventional systems must be checked periodically by stopping the system, hanging known test weights on the scale means, and adjusting the beams if necessary. However, my system enables recalibration to be carried out automatically and continuously while the system is in normal operation. The invention accordingly also provides a conveyor system for use in conveying a succession of articles along a path, the system comprising: a conveyor arranged for movement along said path; a sensing device for arrangement in the path to emit a signal when an article moves past the device; the signal having a precalibrated relationship to the weight of each article; the conveyor having at least one reference weight thereon, so that the calibration of the system may be checked when the reference weight passes the sensing device; and means to automatically adjust the calibration as required when the reference weight passes the sensing device.

BRIEF DESCRIPTION OF THE DRAWINGS

FIG. 1 is a diagrammatic view of one embodiment of a conveyor system according to the invention;

FIG. 2 is a view of part of the apparatus of FIG. 1, looking in the direction of arrow A;

FIGS. 4 and 4a are diagrammatic views illustrating modified forms of control unit.

DESCRIPTION OF EMBODIMENTS OF THE INVENTION

Figure 3:
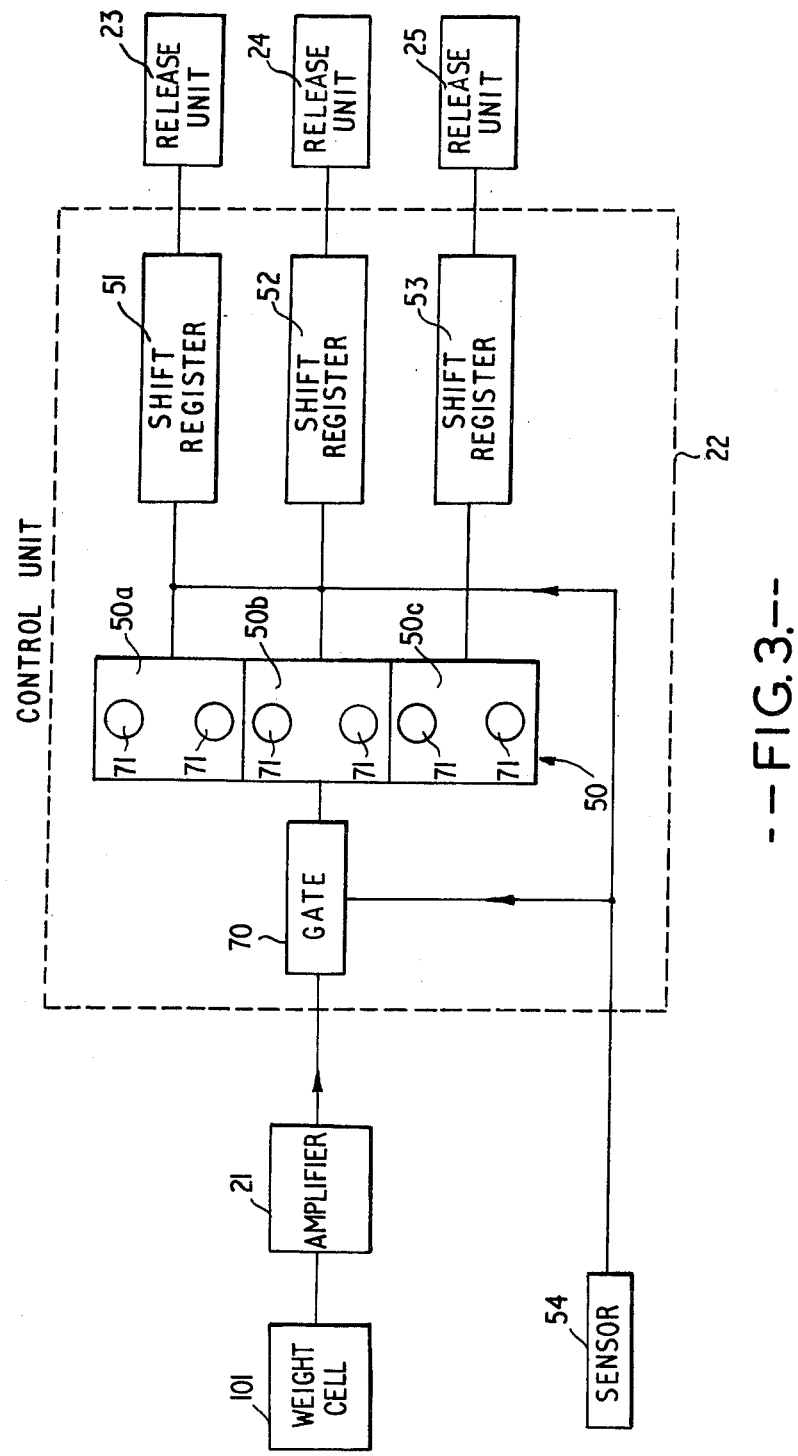
FIG. 3 is a diagrammatic view illustrating details of the control unit of the apparatus shown in FIG. 1.

In the processing of poultry it is common to transport birds (e.g. chickens) on conveyors for transport through various processing stations such as plucking stations and cleaning stations, and it is frequently necessary to sort the poultry carcasses according to weight. This example relates to a conveyor at the final stage of a poultry processing plant, where it is desired to sort the finished carcasses into 2 ounce weight ranges. While there may be as many as eleven or more (e.g., 30) such weight ranges in practice, for example from a 4 lb/4 lb 2 oz range to a 5 lb 4 oz/5 lb 6 oz range, apparatus for sorting into three weights or three ranges of weight only will be described, for simplicity.

FIG. 1 shows part of an endless conveyor comprising a continuous rail 10 along which a plurality of poultry carriers 11 are slidable. Each carrier comprises a carriage 12 arranged on the rail, a chain 13 hanging below the carriage, and a shackle 14 arranged to grip a poultry carcass 9. All the chains 13 are interconnected by a driving chain 15 for pulling the carriers along the rail. Each carrier also has, between the gripping unit 14 and the point of connection of the chain 15 to the chain 13, a stop member of the form of a disc 16.

The shackles 14 are of a conventional type and will not be described in detail. They each have a release lever 8 which, when moved upwardly, causes the shackle to release the carcass which it is carrying.

Positioned at a weighing station 100 is an electronic cell 101, and a vertical shaft 102 having a plurality of radially extending spokes 103. The spokes are pivotally connected to the shaft 102 such that they are free to pivot upwardly above the horizontal, but cannot move below the horizontal. Normally, therefore, gravity maintains the spokes in a position in which they are perpendicular to the shaft 102. The spokes have forked ends, and as the carriers 11 move along the rail 10 each chain 13 in turn engages in the forked end of one of the spokes, at a point immediately below the stop member 16. Thus the shaft 102 is rotated as the carriers 11 move through the weighing station 100. Mounted to one side of the shaft 102 is a roller 104. The roller is rotatable on a horizontal shaft 105 and is positioned so that as each spoke 103 is swung around by a carrier engaged therewith the spoke rides up and over the roller. One spoke is shown in its uppermost position in FIG. 2 and it will be seen that the stop member 16 is unable to pass through the forked end of the spoke so as the spoke rises it lifts the shackle 14, thereby momentarily applying the load of the shackle to the shaft 105, which is connected to the electronic weigh cell 101.

The weigh cell is arranged to transmit an electrical signal when load is applied to the shaft 105. The voltage of the signal is proportional to the load applied, and is passed via an amplifier 21 to a control unit 22. The control unit 22 controls the action of three pneumatically driven release units 23 to 25 which are operable to raise the lever 8 of each shackle 14 to free a carcass from the shackle as it passes the release units. Beneath the three units 23 to 25 there are arranged respectively three receiving bins 26 to 28. The bins are for the receipt of chicken carcasses lying within three weight ranges X, Y and Z respectively.

When the conveyor is running the chain 15 moves to the right as viewed in FIG. 1 and each shackle 14, in turn, together with the chicken carcass gripped thereby, engages a spoke 103 and is raised thereby on to the roller 104. When the weight of shackle 14 and its carcass is applied to the roller 104, a signal is transmitted by the cell 101 and the control unit 22 receives a signal indicating which weight range the relevant chicken carcass lies within. This information is then memorised and associated with the relevant shackle 14 by the control unit and when the relevant shackle 14 passes the release unit (23, 24 or 25) appropriate to that weight range the carcass is freed from the gripping unit and falls into the appropriate bin.

As shown in FIG. 3, the control unit 22 has a signalling section 50 which receives the information regarding weight range from the amplifier 21. The signalling section 50 comprises three comparators 50a, 50b and 50c, each connected respectively to one of three shift registers 51, 52 and 53. The three shift registers are associated respectively with the three release units 23, 24 and 25. Each shift register has a number of sections which is equal to the number of shackles lying between the cell 101 and the associated release unit.

The signalling section 50 is connected to the amplifier 21 by a gate 70. A sensing device 54 (e.g. a proximity switch) is positioned at the weighing station and emits a pulse each time a shackle reaches the optimum weighing position at the weighing station. This pulse opens the gate 70 and allows the amplified weight signal to be monitored by the comparators 50a, 50b and 50c. Each comparator has an upper and a lower voltage preset therein, by means of two potentiometers. The dials of the potentiometers are indicated at 71 in FIG. 3 and may be graduated in units of weight. The settings of the potentiometers of comparator 50a determine the weight range associated with release unit 23, those of comparator 50b determine the weight range associated with release unit 24, and so on.

Each comparator compares the voltage received from amplifier 21 via gate 70 with the voltage range preselected in the comparator and if the received voltage lies within the preselected range the comparator feeds a signal into the shift register associated therewith. Since in use the comparators are preset to mutually exclusive weight ranges, only one shift register will receive a signal, for each weight signal transmitted by the weigh cell 101. Signals in the shift registers are clocked through the sections of the shift registers in dependence upon the movement of the shackles, by virtue of the sensing device 54 which also send a clocking pulse to each shift register, every time a shackle passes the sensing device 54. It will be appreciated that because of the relationship between the number of sections in each shift register and the number of shackles lying between the weighing station and the associated release unit, a signal initiated by a particular carcass will reach the release mechanism associated with that weight of carcass at the same time as the carcass reaches the release unit.

Thus if the shackle 14 immediately to the left of shaft 102, as viewed in FIG. 1, carries a carcass lying within the weight range X, the control unit 22 will receive an appropriate signal when the shackle 14 is raised on to the roller 104. This signal will lie within the range preselected in comparator 50a and will cause a release signal to be fed into shift register 51 and as the shackle travels towards the release unit 23, the release signal will be clocked through the shift register by pulses generated by the succeeding shackles passing the sensing device 54. At the instant that the shackle reaches the release unit 23, the release signal will emerge from the last section of the shift register 51 and will actuate the release shift 23. Similarly, by virtue of the shift register 52, the unit 22 is programmed such that when it receives a signal indicating that a carcass within weight range Y is on roller 104, it activates release unit 24 after the shackle generating that signal has reached the unit 24. Similar programming arrangements are made for the activation of release unit 25 and it will be seen that as each shackle is weighed, the unit 22 stores the relevant information in the shift registers and the carcasses carried by the shackles are freed when each carcass is above its appropriate bin.

Since each shift register is associated with one particular release unit, each shift register together with the associated comparator, can conveniently be made as a replaceable modular component. If it is desired to remove one or more release units, then the shift registers associated therewith can be conveniently removed also. If it is desired to add further release units, or re-position the release units, then further shift registers can be fitted into the system or the shift registers can be replaced by other shift registers having a different number of sections, the number of sections in each shift register being directly related to the new position of the associated release unit.

The shackles are raised and weighed so that there is no disturbance of the position of the chain 15. If a floating portion of the rail 10 were provided for example, the whole of an article carrier 11 would be moved downwardly during weighing. Thus the relevant portion of the chain 15 would be pulled downwards and the increased tension in the chain would interfere with the weighing measurement.

It is important that the shackles are able to run as freely as possible and the form of rail 10 and carriages 12 has been found to be particularly effective in this respect. The rail comprises a cylindrical tube and each carriage comprises a Y-shaped bracket 31, the arms of the Y each carrying a shaft on which a wheel 33 is mounted. The wheels run along the upper surfaces of the tube as shown.

Under certain circumstances a user of the apparatus described above may wish to deposit carcasses at a particular rate into at least one of the bins, bin 26 for example. He may wish to do this, for instance, to meet a demand for carcasses having a weight in the region of range X for example. If there are sufficient carcasses on the conveyor which lie within range X then the requirements are automatically fulfilled but if the number of carcasses within range X is less than that required to meet the demand the user may wish to increase range X to encompass a wider weight band, thereby increasing the rate at which carcasses are sorted into bin 26.

The control unit may be modified as shown in FIG. 4 by providing two comparators 50a, each associated with the shift register 51 and release unit 23. One comparator has its potentiometers 72 adjusted to the normal weight range and the other has its potentiometers 73 adjusted to a slightly wider range. Each comparator 50a is connected to the shift register 51 by a separate gate and the gates 74, 75 are controlled respectively by the two outputs 76, 77 of a differential counter 55. The gate 74 associated with the wider weight range is normally closed and the gate 75 associated with the normal weight range is normally open. Thus it is the comparator associated with the normal weight range which normally sends a signal to the shift register 51. Both comparators monitor the signals received from the gate 70, but even if a signal is within the wider weight range the associated comparator has no effect since the gate 74 connected thereto is closed.

The outputs of the gates 74 and 75 are connected not only to the shift register 51 but also to one of the inputs of the differential counter 55. The other input of the differential counter is connected to a pulse generator 56, which can be set to feed negative counting pulses to the differential counter 55 at a rate corresponding to the desired rate of feed of carcasses into the bin 26. Since the said one input of the differential counter receives a positive pulse each time a release signal is fed to the shift register 51, it follows that the count in the counter will remain positive or zero as long as the rate of drop-off of birds into bin 26 remains greater than or equal to the rate at which negative pulses are supplied by the generator 56. If the rate of drop-off is too low however, the count in the counter goes negative, causing the output signals of the differential counter to change over, opening the normally closed gate 74 and closing the normally open gate 75. Thus only the comparator 50a associated with the wider range will be effective to signal shift register 51, until such time as the count in differential counter 55 again reaches zero or above, whereupon the counter outputs change back again and the gates 74 and 75 revert to their normal state.

The control unit may be similarly modified to control the rate of feed of carcasses into bins Y and Z.

FIG. 4A shows an alternative arrangement which may be used to control the switching of the gates 74 and 75 according to demand. The differential counter 55 is replaced by a batch counter 78 and a comparator 79 is coupled to the batch counter. The outputs 76 and 77 to the gates 74 and 75 are taken from the comparator 79 and the comparator is arranged so that its outputs normally maintain gate 74 closed and gate 75 open. A pulse generator 80 is connected to the comparator 79 and at the start of a period during which it is desired to supply carcasses at the rate of say, ten per minute, the counter 78 is set to indicate a count of ten and the pulse generator 80 is set to emit one pulse per minute. At the end of the first minute the pulse fed to the comparator 79 by the pulse generator opens a gate and permits the comparator to monitor the count in the counter. Release signal pulses are fed to the counter via line 81 and if ten or more release signals have been fed to the relevant shift register, the counter will indicate zero. The comparator is arranged so that if the count is zero, it maintains its outputs in the normal state so that gate 74 remains closed and gate 75 remains open. If however the comparator detects a positive count in the counter, at the end of any one minute interval, its outputs change over and the wider weight range is utilised until a zero count is again detected, whereupon the outputs revert to their normal state. The pulse generator can be set to emit a pulse at any time interval from ½ minute up to 2 minutes, in ½ minute increments.

Figure 5:
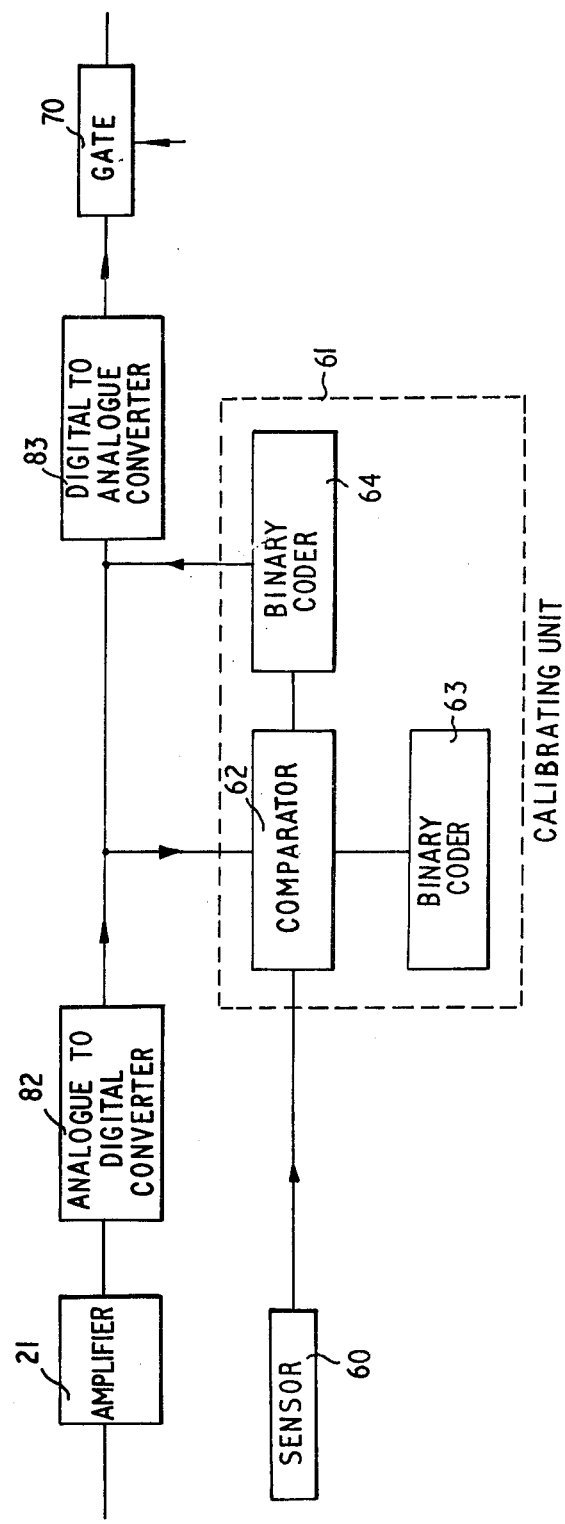
FIG. 5 is a diagrammatic view illustrating yet another modification to the control unit.

The control unit may be provided with means as shown in FIG. 5 to ensure that the weighing system remains accurately calibrated. Known reference weights are arranged on some of the shackles, spaced spart equidistantly around the rail 10. Means are provided to specially identify each reference weight when it reaches the roller 104, for example, the reference weight may carry a magnet which operates a sensor 60 (FIG. 5). The amplifier 21 is coupled to an analogue to digital converter 82 and each time the sensor 60 is actuated, the digitised weight signal emerging from the converter 82, which has been generated by a reference weight, is monitored by a calibrating unit 61. The unit 61 comprises a comparator 62 which compares the digitised weight signal with a binary reference signal equal to the signal which ought to be generated by the reference weight. The reference signal is preselected on a binary code indicator 63 within the unit 61. If there is a discrepancy between the reference signal and the signal from the converter 82, the comparator causes an amount equal to the discrepancy to be applied to the digitised weight signals subsequently emitted by the converter 82 so that corrected weight signals pass to the rest of the control unit. A digital to analogue converter 83 is provided to reconvert the weight signals to analogue form. The calibrating unit 61 can be arranged to use the discrepancy directly, thereby applying a correction which is equal to the error. Alternatively it can be arranged to switch on a correction unit 64, which is simply another binary code indicator arranged to apply a fixed correction, the passage of the next reference weight causing a further fixed correction to be applied if the initial correction was insufficient.

If the weight signals generated do not vary with the weight sensed according to a linear relationship, a plurality of different reference weights may be used, for example one having a weight lying in the middle of range X, one having a weight lying in the middle of range Y, and one having a weight lying in the middle of range Z. The weights are separately identified when each one reaches the weighing station and are compared with appropriate reference signals by the calibrating unit.

I claim:

1. A conveyor system for use in sorting a plurality of articles according to their weight, said system comprising:
    (a) an overhead conveyor comprising a continuous rail defining a path and a plurality of shackles movable therealong in succession, each shackle being arranged to carry a poultry carcass,
    (b) a weighing station disposed along said path,
    (c) an electronic weight sensing transducer arranged at said weighing station to emit a weight signal related to the weight of each poultry carcass as said carcass passes through said weighing station,
    (d) a plurality of sorting stations spaced apart along said path downstream of said weighing station, each sorting station being associated with carcasses having a particular weight range,
    (e) a shackle release device and a carcass receiving container arranged at each sorting station,
    (f) a sensing device arranged to emit a counting pulse each time a shackle passes said sensing device, and
    (g) control means connected to said weight sensing transducer, said sensing device and each of said shackle release devices to receive and store said weight signals and said counting pulses and to actuate each shackle release device when there arrrives at the associated sorting station a shackle carrying a carcass having a weight lying in the weight range associated with the particular sorting station to sort said articles by weight.

2. A conveyor system as claimed in claim 1, in which the control means comprises a plurality of shift registers, one shift register being connected to each of said article removal devices, and means to select a shift register on receipt of a weight signal and feed a signal into the selected shift register.

3. A conveyor system as claimed in claim 1, in which each of said shift registers has a number of sections equal to the number of pulses emitted by said pulse emitter means during passage of an article from said weight sensing device to the removal device associated with said shift register, said pulse emitter means being connected to each of said shift registers such that each time a pulse is emitted thereby any signal in said shift register is indexed from one section of the shift register to the next section of the shift register.

4. A conveyor system as claimed in claim 3, in which each shift register comprises a replaceable modular component.

5. A conveyor system for use in sorting a plurality of articles according to their weight, said system comprising:
    (a) A conveyor for conveying said articles in succession along a path,
    (b) a weight sensing device arranged along said path to emit a weight signal related to the weight of each article sensed by said weight sensing device as each article moves along at least a portion of said path,
    (c) a plurality of removal devices for removing articles from said conveyor, said removal devices being spaced apart along said path downstream of said weight sensing device, and
    (d) control means connected to said weight sensing device and each of said plurality of article removal devices, said control means being adapted to receive said weight signals and to selectively control said article removal devices so that each article removal device removes from the conveyor articles lying within a preselected weight range,
    (e) said control means including means for preselecting a desired rate of article removal by at least one of the article removal devices, and means, responsive to said means for preselecting a desired rate of article removal, for changing the weight range associated with said one article removal device if the rate at which articles are removed differs from said preselected desired rate.

6. A conveyor system as claimed in claim 5, in which said means for preselecting a desired rate of article removal comprises a pulse generator operable to emit pulses at the desired rate, the conrol means incorporating means to compare the rate at which pulses are emitted by the pulse generator with the rate at which articles are removed from the coneyor by said one article removal means.

7. A conveyor system as claimed in claim 5, in which said means for preselecting a desired rate of article removal comprises a counter for use in preselecting the number of articles which it is desired to remove in a given period of time, the control means incorporating means to compare the desired number with the number of articles which are actually removed in the given period of time.

8. A conveyor system as claimed in claim 7, in which said comparison means are connected to potentiometer means controlling the limits of said preselected weight range.

9. A conveyor system as claimed in claim 5 wherein said means for changing the weight range associated with said one article removal device is adapted to expand the weight range if the weight at which articles are removed is less than said preselected desired rate and to reduce the weight range from the expanded weight range to said preselected weight range if the rate at which articles are removed is greater than said preselected desired rate.

10. A conveyor system as claimed in claim 9 wherein said weight sensing device is an electronic weight sensing transducer.

11. A conveyor system for use in conveying a succession of articles along a path, the system comprising:
 (a) a conveyor arranged for movement along said path,
 (b) a sensing device for arrangement in the path to emit a signal when an article moves past the device,
 (c) the signal having a pre-calibrated relationship to the weight of each article,
 (d) the conveyor having at least one reference weight thereon, so that the calibration of the system may be checked when the reference weight passes the sensing device, and
 (e) means to automatically adjust the calibration as required each time the reference weight passes the sensing device.

12. A conveyor system as claimed in claim 11 wherein said said sensing device is an electronic weight sensing transducer.

13. A conveyor system as claimed in claim 11, having means to generate a reference signal related to the test signal which should be emitted by the sensing device when a referrence weight passes the sensing device if the system is correctly calibrated, means to compare the reference signal with the test signal actually emitted by the sensing device when the said reference weight passes the sensing device, and means to apply a correction to subsequent signals emitted by the sensing device if there is a discrepancy between the reference signal and the test signal.

14. A conveyor system as claimed in claim 11, in which there are a plurality of reference weights spaced apart along the conveyor.

15. A conveyor system as claimed in claim 14, in which a plurality of progressively larger reference weights are provided, each one for use in checking the calibration of a different weight range.

* * * * *